United States Patent
Calhoun et al.

(10) Patent No.: US 11,814,501 B2
(45) Date of Patent: Nov. 14, 2023

(54) METHODS FOR REDUCING MOISTURE CONTENT IN ALKALINE EARTH METAL CARBONATES

(71) Applicant: INCOA Performance Minerals, LLC, Salt Lake City, UT (US)

(72) Inventors: Allison Anne Calhoun, Walla Walla, WA (US); Charles Michael Blevins, Daphne, AL (US)

(73) Assignee: Incoa Performance Minerals, LLC, Salt Lake City, UT (US)

( * ) Notice: Subject to any disclaimer, the term of this patent is extended or adjusted under 35 U.S.C. 154(b) by 603 days.

(21) Appl. No.: 16/763,156

(22) PCT Filed: Nov. 15, 2018

(86) PCT No.: PCT/US2018/061209
§ 371 (c)(1),
(2) Date: May 11, 2020

(87) PCT Pub. No.: WO2019/099618
PCT Pub. Date: May 23, 2019

(65) Prior Publication Data
US 2021/0221974 A1    Jul. 22, 2021

Related U.S. Application Data

(60) Provisional application No. 62/735,373, filed on Sep. 24, 2018, provisional application No. 62/587,932, filed on Nov. 17, 2017.

(51) Int. Cl.
| | |
|---|---|
| C08K 3/26 | (2006.01) |
| B02C 17/16 | (2006.01) |
| B02C 17/18 | (2006.01) |
| C01F 11/18 | (2006.01) |
| C08K 9/04 | (2006.01) |
| C09C 1/02 | (2006.01) |
| B02C 21/00 | (2006.01) |
| B02C 23/12 | (2006.01) |
| C08J 5/18 | (2006.01) |
| C09D 11/037 | (2014.01) |
| C09J 11/04 | (2006.01) |

(52) U.S. Cl.
CPC .............. *C08K 3/26* (2013.01); *B02C 17/16* (2013.01); *B02C 17/1815* (2013.01); *B02C 17/1845* (2013.01); *B02C 21/00* (2013.01); *B02C 23/12* (2013.01); *C01F 11/185* (2013.01); *C08J 5/18* (2013.01); *C08K 9/04* (2013.01); *C09C 1/021* (2013.01); *C09D 11/037* (2013.01); *C09J 11/04* (2013.01); C01P 2004/03 (2013.01); C01P 2004/61 (2013.01); C01P 2004/62 (2013.01); C01P 2006/82 (2013.01); C08J 2323/00 (2013.01); C08J 2327/06 (2013.01); *C08J 2375/04* (2013.01); *C08K 2003/265* (2013.01); *C08K 2201/005* (2013.01)

(58) Field of Classification Search
CPC ...... C08K 3/26; C08K 9/02; C08K 2003/265; C08K 2201/05; C08K 7/00; C08K 2003/262; B02C 17/16; B02C 17/185; B02C 17/1845; B02C 21/00; B02C 23/12; C01F 11/185; C08J 5/18; C08J 2323/00; C08J 2327/06; C08J 2375/04; C09D 11/037; C09J 11/04; C01P 2004/03; C01P 2004/61; C01P 2004/62; C01P 2006/82; C01P 2006/80; C01D 7/00; C09C 1/02
USPC ...................................................... 524/427
See application file for complete search history.

(56) References Cited

U.S. PATENT DOCUMENTS

| | | |
|---|---|---|
| 2002/0022084 A1 | 2/2002 | Calhoun et al. |
| 2007/0167531 A1 | 7/2007 | Preston et al. |
| 2015/0083831 A1 | 3/2015 | Shaw et al. |
| 2017/0129782 A1 | 5/2017 | Buri et al. |

(Continued)

FOREIGN PATENT DOCUMENTS

| | | |
|---|---|---|
| CN | 101812238 A | 8/2010 |
| CN | 102634240 A | 8/2012 |

(Continued)

OTHER PUBLICATIONS

Notification of the First Office Action for Chinese Application No. 201880074047.9 dated Dec. 1, 2021 with English translation.

(Continued)

*Primary Examiner* — Hannah J Pak
(74) *Attorney, Agent, or Firm* — WOMBLE BOND DICKINSON (US) LLP

(57) ABSTRACT

Methods for reducing moisture content of alkaline earth metal carbonate may include introducing alkaline earth metal carbonate having a moisture content ranging from about 0.1% by mass to about 10% by mass into a primary crusher and operating the primary crusher to obtain alkaline earth metal carbonate particles having a top cut particle size $d_{90}$ of 90 microns or less. The method may also include introducing the particles into a primary grinder and operating the primary grinder to obtain reduced-size alkaline earth metal carbonate particles having a median particle size $d_{50}$ of about 60 microns or less. The method may further include introducing the reduced-size particles into a classifier mill and operating the classifier mill to obtain further-reduced-size alkaline earth metal carbonate particles having a median particle size $d_{50}$ of about 12 microns or less, and a moisture content of about 0.15% by mass or less.

17 Claims, 10 Drawing Sheets

(56) References Cited

U.S. PATENT DOCUMENTS

2017/0275175 A1  9/2017  Buri et al.
2018/0353930 A1  12/2018 Rentsch et al.
2021/0214522 A1* 7/2021  Blevins ................. C01F 11/185

FOREIGN PATENT DOCUMENTS

| CN | 107075172 A | 8/2017 |
|----|----|----|
| WO | WO 1999/028050 A1 | 6/1999 |
| WO | WO 01/85832 A2 | 11/2001 |
| WO | WO 2016/041781 A1 | 3/2016 |
| WO | WO 2017/220167 A1 | 12/2017 |

OTHER PUBLICATIONS

Wu et al., Mechanochemical Surface Modification of Particles by Polymer Grafting, 2005, retrieved from internet <url:http://www.sibran.ru/upload/iblock/bf2/bf22141ccleb7c896247ed4f1203fa.50.pdf> pp. 149-154.

* cited by examiner

METHODS FOR REDUCING MOISTURE CONTENT IN ALKALINE EARTH METAL CARBONATES

This is a 35 U.S.C. § 371 national stage entry of PCT International Patent Application No. PCT/US2018/061209, filed Nov. 15, 2018, which claims benefit of the filing dates of U.S. Provisional Application No. 62/587,932, filed Nov. 17, 2017, and U.S. Provisional Application No. 62/735,373, filed Sep. 24, 2018, the disclosures of all of which are incorporated herein by reference.

CLAIM OF PRIORITY

This PCT International Patent application claims benefit of the filing dates of U.S. Provisional Application No. 62/587,932, filed Nov. 17, 2017, and U.S. Provisional Application No. 62/735,373, filed Sep. 24, 2018, the disclosures of both of which are incorporated herein by reference.

BACKGROUND

Alkaline earth metal carbonates, such as, for example, calcium carbonates, may be used as particulate fillers in end products including polymer compositions and other compositions. For example, alkaline earth metal carbonates may be incorporated into polymer compositions for forming products such as, for example, polyolefin containing products, polymer films, and rigid vinyl products, such as vinyl siding, vinyl gutters, vinyl decking, vinyl fencing, vinyl window profiles, and vinyl siding, and water-reactive polymers. The polymer compositions from which films are made may often include a polymer (e.g., a thermoplastic polymer) and an alkaline earth metal carbonate, such as calcium carbonate, which may be used as a filler and/or for other purposes. Some polymer compositions may be used for three-dimensional printing. The characteristics of the alkaline earth metal carbonate may play an important role in the processing of the polymer composition and/or may affect characteristics of the polymer containing product. For example, moisture in the alkaline earth metal carbonate may create problems when the alkaline earth metal carbonate is used, for example, in polymer compositions. Thus, it may be desirable to provide alkaline earth metal carbonates having reduced moisture content, which, along with other characteristics, may improve the processing and/or final characteristics of the polymer containing product. In addition, alkaline earth metal carbonates may be used in food products, pharmaceuticals, joint compound, paints, adhesives, sealants, and caulks, and the characteristics of the alkaline earth metal carbonate may play an important role in the processing of such end uses and/or may affect characteristics of the end products.

BRIEF DESCRIPTION OF THE DRAWINGS

The detailed description is described with reference to the accompanying figures.

DETAILED DESCRIPTION

Figure 1:
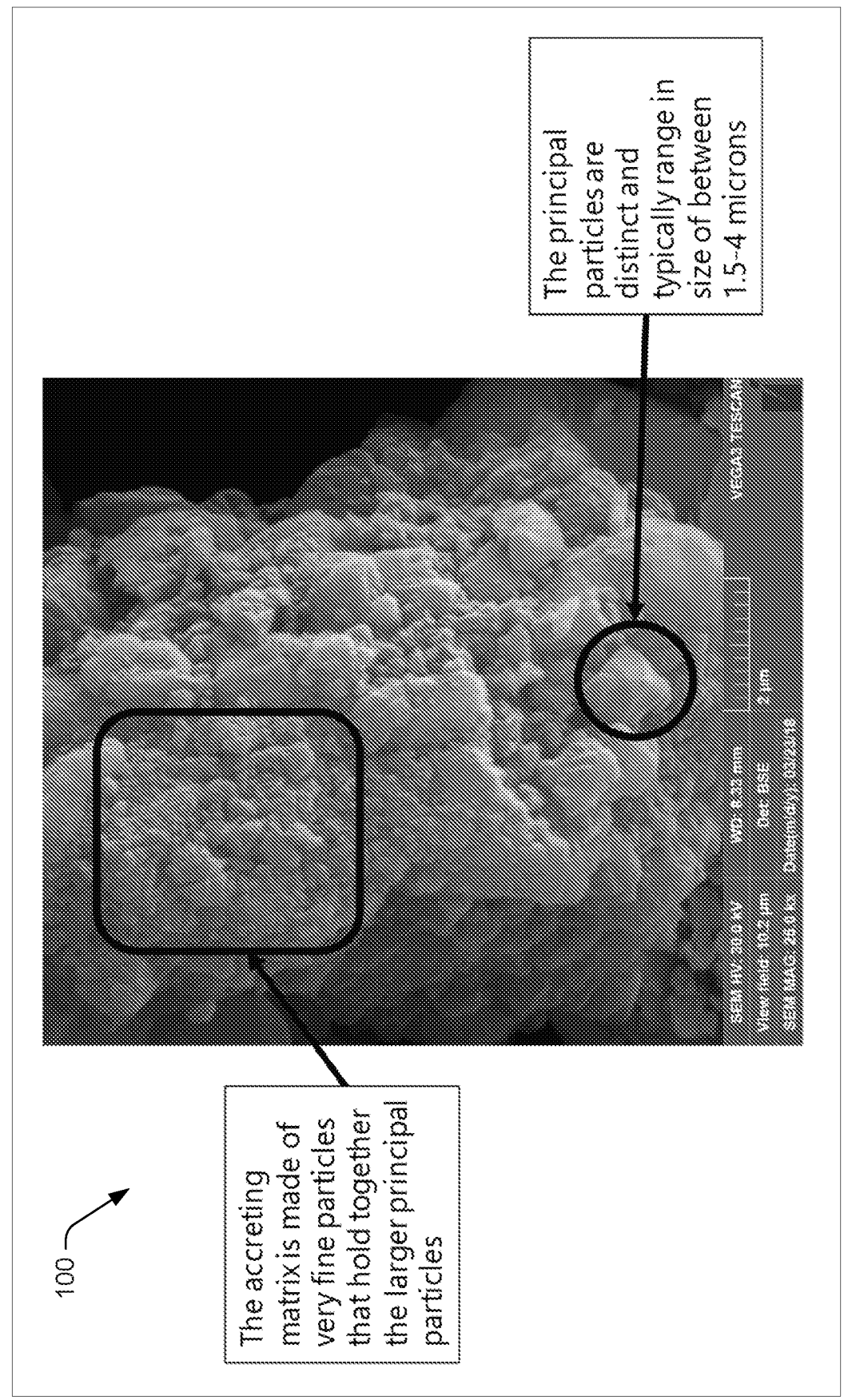
FIG. 1 is a scanning electron micrograph image of an example alkaline earth metal carbonate sample prior to processing according to the example methods described herein.

This disclosure is generally directed to methods for reducing moisture content from alkaline earth metal carbonate particulates. For example, a method for reducing moisture content of alkaline earth metal carbonate may include introducing alkaline earth metal carbonate (e.g., calcium carbonate-containing mine rock) having a moisture content ranging from about 0.1% by mass to about 10% by mass (e.g., ranging from about 1.0%, 2.0%, 3.0%, 4.0%, 5.0%, 6.0%, 7.0%, 8.0%, or 9.0% by mass to about 10% by mass) into a primary crusher, which may include, for example, a roll crusher, a cone crusher, a jaw crusher, or an impact crusher, and operating the primary crusher to obtain alkaline earth metal carbonate particles, such that the alkaline earth metal carbonate particles have a top cut particle size $d_{90}$ of 90 microns or less. The method may also include introducing the alkaline earth metal carbonate particles into a primary grinder (e.g., an air-swept stirred media mill, a hammer mill, or any other type of mill) and operating the primary grinder to obtain reduced-size alkaline earth metal carbonate particles, such that the reduced-size alkaline earth metal carbonate particles have a median particle size $d_{50}$ of about 60 microns or less. The method may further include introducing the reduced-size alkaline earth metal carbonate particles into a classifier mill (e.g., a ball mill, a ball mill coupled to a classifier, and/or an air classifier mill), and operating the classifier mill to obtain further-reduced-size alkaline earth metal carbonate particles, such that the further-reduced-size alkaline earth metal carbonate particles have a median particle size $d_{50}$ of about 12 microns or less. In some examples of the method, the moisture content of the further-reduced-size alkaline earth metal carbonate particles is about 0.15% by mass or less.

"Particle size," as used herein, for example, in the context of particle size distribution (psd), may be measured in terms of equivalent spherical diameter (esd). Particle size properties referred to in the present disclosure may be measured in a well-known manner, for example, by laser using a Malvern LLS® device. Such a machine may provide measurements and a plot of the cumulative percentage by volume of particles having a size, referred to in the art as "equivalent spherical diameter" (esd), less than the given esd values. For example, the mean or median particle size $d_{50}$ is the value that may be determined in this way of the particle esd at which there are 50% by volume of the particles that have an esd less than that $d_{50}$ value. The top cut particle size $d_{90}$ is the value that may be determined in this way of the particle esd at which there are 90% by volume of the particles that have an esd less than that $d_{90}$ value. In some instances, particle size may be measured by determining the retained mass on a standardized screen with a mesh size consistent with the median.

In a further aspect, a method for reducing moisture content in alkaline earth metal carbonate may include introducing alkaline earth metal carbonate having a moisture content ranging between about 0.1% by mass to about 10% by mass (e.g., ranging from about 1.0%, 2.0%, 3.0%, 4.0%, 5.0%, 6.0%, 7.0%, 8.0%, or 9.0% by mass to about 10% by mass) into a primary crusher and operating the primary crusher to obtain alkaline earth metal carbonate particles having a moisture content of about 3.0% by mass or less. The method may further include introducing the alkaline earth metal carbonate particles into a primary grinder and operating the primary grinder to obtain reduced-size alkaline earth metal carbonate particles having a moisture content of about 1.0% by mass or less. The method may further include introducing the reduced-size alkaline earth metal carbonate particles into a classifier mill and operating the classifier mill to obtain further-reduced-size alkaline earth metal carbonate particles having a moisture content of about 0.15% by mass or less.

In still a further aspect, a method for reducing moisture content of alkaline earth metal carbonate may include introducing alkaline earth metal carbonate having a moisture content of about 10% by mass or less into a primary grinder, and operating the primary grinder to obtain reduced-size alkaline earth metal carbonate particles, such that the reduced-size alkaline earth metal carbonate particles have a median particle size $d_{50}$ of about 60 microns or less and a moisture content of about 0.1% by mass or less. The method may also include introducing the reduced-size alkaline earth metal carbonate particles into a classifier mill and operating the classifier mill to obtain further-reduced-size alkaline earth metal carbonate particles, such that the further-reduced-size alkaline earth metal carbonate particles have a moisture content of about 0.15% by mass or less.

In some examples, grinding methods (e.g., dry grinding methods) may be characterized by adding the material to be ground to a mill without the addition of water or another liquid prior to or during the grinding method. For example, the absence of water or other liquids in some examples of this method may provide a ground mineral without entrained water or other chemicals that are known to interfere with the final performance of the alkaline earth metal carbonate particulate in its intended use. For example, entrained water is known to create degradation of water-reactive polymers, offgas during high temperature polymer processing, which leads to material defects, and/or to promote agglomeration that may interfere with effective dispersion of the ground alkaline earth metal carbonate particulate in a variety of polymeric- and aqueous-based systems. Residual chemicals from liquids other than water are known to promote degradation of a variety of polymeric materials and act to absorb water into the particulate. In some examples, the grinding method may be characterized by an absence of grinding aids and/or process chemicals in the mill during the grinding method, which may result in one or more of the above-noted attributes.

In some examples, the method may not include introducing any of the alkaline earth metal carbonate, the alkaline earth metal carbonate particles, the reduced-size alkaline earth metal carbonate particles, or the further-reduced-size alkaline earth metal carbonate particles into a dryer. Thus, in some examples of the method, no drying steps including the application of heat, for example, for the sole purpose of removing moisture from the alkaline earth metal carbonate (in any of the forms during processing (e.g., during processes for particle size reduction and/or classification)), are performed. As a result, some examples of the method for reducing moisture content described herein may result in reduced equipment requirements (e.g., no drying and/or dewatering equipment is required), reduced energy consumption (e.g., to operate drying and/or dewatering equipment), and/or reduced space requirements (e.g., space for drying and/or dewatering equipment).

Some examples of the method may result in relatively reduced area requirements for equipment used to perform the processes as compared to conventional particulate manufacturing methods. For example, as noted above, some methods described herein may be characterized by an absence of adding water, dispersants, and/or grinding aids. By not adding water, equipment conventionally necessary for adding water and containing the resulting material slurries may require significant space. In processes adding water, chemical dispersants may also be added to aid with such processing, and further, adding water may also result in the use of dryers in order to remove moisture from the resulting particulates. The addition of chemical dispersants may require additional space for storing and adding the dispersants, and drying requires the space for dryers to be added and operated. Thus, some methods described herein may result in a significant reduction in the space relative to the space required to accommodate equipment common in conventional particulate manufacturing processes.

Some examples of the methods described herein may also result in an ability to produce particulate products that are tailored to market demand rather than particulate products that result from processing steps and that must be marketed as out-of-specification alternatives. For example, many conventional particulate manufacturing processes may result in necessarily producing particulate products that do not have characteristics desired by customers. Such out-of-specification products, rather than being produced to satisfy a particular customer order, must be sold at a fraction of the potential value of the material or discarded. In some examples of the methods described herein, due to the processes involved, only a very small fraction of the particulate material resulting from the methods may have characteristics that are not within the characteristics tailored to meet market demand. This may result in a relatively much higher realization of the potential market value of the raw material received from the mining operation and/or significantly reduced material waste.

As noted above, many conventional particulate manufacturing processes use chemical dispersants during the process. This may result in use of environmentally unfriendly chemicals that must be properly disposed of in order to avoid harmful environmental effects, which results in additional manufacturing costs. In some examples of the methods described herein, chemical dispersants and other potentially harmful chemicals are not used as part of the process. This, in turn, may reduce costs by eliminating the need to purchase dispersants and/or pay for their proper disposal.

In some conventional particulate manufacturing processes, a large fraction of the material from the mine may be lost during the manufacturing process. For example, due to the addition of water and dispersants and the subsequent drying, as much as fifty percent or more of the mined material may be lost in the form of waste as the material goes from the mining process to the end product. In some examples of the method described herein, the material waste may be as little as five percent due to the efficient nature of the methods.

As a result of being relatively more complex, it may be difficult to alter (e.g., add, subtract, and/or re-order) manufacturing steps in conventional particulate manufacturing processes. This may render it relatively more difficult, time consuming, and/or costly to change manufacturing processes to meet market demands. In some examples of the methods described herein, it may be possible to alter the manufacturing steps relatively more quickly and efficiently to meet changing market demands.

For at least some conventional particulate manufacturing processes, it may be difficult to trace material from the mine to the end product, particularly in processes that add water and/or dispersants during the process. Traceability may be important for certain markets, such as the food industry and pharmaceutical industry, which may desire traceability to ensure product safety and adherence to important specifications. In the absence of traceability, it may be very difficult to identify material that does not meet the product specifications and/or that has been contaminated by an unwanted material. In some such instances, unless the offending material can be quickly traced, identified, and isolated, it may be necessary to discard a significant amount of product before such problems may be corrected with confidence sufficient for customers. Some example methods described herein may result in improved traceability relative to conventional processes, for example, due to the lack of adding water and/or dispersants during the process.

In some examples, operating the primary crusher may include operating the primary crusher such that the alkaline earth metal carbonate particles have a moisture content of about 3.0% by mass or less. In some examples, operating the primary grinder may include operating the primary grinder such that the reduced-size alkaline earth metal carbonate particles have a moisture content of about 1.0% by mass or less. In some examples, operating the classifier mill may include operating the classifier mill such that the further-reduced-size alkaline earth metal carbonate particles have a moisture content of about 0.10% by mass or less, a moisture content of about 0.09% by mass or less, a moisture content of about 0.08% by mass or less, a moisture content of about 0.075% by mass or less, a moisture content of about 0.07% by mass or less, a moisture content of about 0.06% by mass or less, or a moisture content of about 0.05% by mass or less.

In some examples, operating the primary crusher may include operating the primary crusher such that the alkaline earth metal carbonate particles have a top cut particle size $d_{90}$ of about 0.5 inches or less, 0.25 inches or less, or 0.125 inches or less.

In some examples, operating the primary grinder may include operating the primary grinder such that the reduced-size alkaline earth metal carbonate particles have a median particle size $d_{50}$ of about 50 microns or less, a median particle size $d_{50}$ of about 45 microns or less, a median particle size $d_{50}$ of about 40 microns or less, a median particle size $d_{50}$ of about 35 microns or less, a median particle size $d_{50}$ of about 30 microns or less, or a median particle size $d_{50}$ of about 25 microns or less.

In some examples, the alkaline earth metal carbonate particles introduced into the primary grinder may have a level of sub-0.5-micron particles ranging from about 10% to about 0% of alkaline earth metal carbonate particles (e.g., from about 10% to about 1%, from about 10% to about 2%, from about 9% to about 0%, or from about 8% to about 0%), wherein the level of sub-0.5-micron particles includes particles having a particle size of 0.5 microns or less (e.g., 0.4 microns or less, 0.3 microns or less, 0.2 microns or less, or 0.1 microns or less). Low levels of sub-0.5-micron particles may improve dispersion and/or may reduce the surface area of the mineral, which may help reduce agglomeration and moisture absorption, additive absorption in formulations, and/or viscosity of the final formulation.

In some examples, operating the classifier mill may include operating the classifier mill such that the further-reduced-size alkaline earth metal carbonate particles have a median particle size $d_{50}$ of about 8 microns or less, a median particle size $d_{50}$ of about 7.5 microns or less, a median particle size $d_{50}$ of about 7 microns or less, a median particle size $d_{50}$ of about 6.5 microns or less, a median particle size $d_{50}$ of about 6 microns or less, a median particle size $d_{50}$ of about 5.5 microns or less, a median particle size $d_{50}$ of about 5 microns or less, a median particle size $d_{50}$ of about 4.5 microns or less, a median particle size $d_{50}$ of about 4 microns or less, a median particle size $d_{50}$ of about 3.5 microns or less, a median particle size $d_{50}$ of about 3 microns or less, a median particle size $d_{50}$ of about 2.5 microns or less, a median particle size $d_{50}$ of about 2 microns or less, a median particle size $d_{50}$ of about 1.5 microns or less, a median particle size $d_{50}$ of about 1 micron or less, a median particle size $d_{50}$ of about 0.8 microns or less, a median particle size $d_{50}$ of about 0.7 microns or less, a median particle size $d_{50}$ of about 0.6 microns or less, or a median particle size $d_{50}$ of about 0.5 microns or less.

In some examples, the alkaline earth metal carbonate may include calcium carbonate, and introducing the alkaline earth metal carbonate into the primary crusher may include introducing calcium carbonate into the primary crusher. In some examples, the alkaline earth metal carbonate introduced into the primary crusher may include a raw feed of alkaline earth metal carbonate containing mine rock obtained from a mine. In some examples, the raw feed of the alkaline earth metal carbonate may include calcium carbonate sourced from a reserve providing a particulate metal carbonate that has a minimum purity of, for example, about 95% calcium carbonate, as measured by x-ray fluorescence (XRF), or greater than, for example, about 99% calcium carbonate with a level of acid insoluble minerals below, for example, about 2% or below, for example, about 0.1%. Some examples of these acid insoluble minerals may be of a natural size of below, for example, about 5 microns. In some examples of the raw feed, the morphology of the particles may be of a generally rounded shape. Other types of alkaline earth metal carbonates are contemplated.

In some examples, introducing the alkaline earth metal carbonate into the primary crusher may include introducing alkaline earth metal carbonate into the primary crusher that has a purity ranging from about 97.5% to about 99.9%. In some examples, introducing the alkaline earth metal carbonate into the primary crusher may include introducing alkaline earth metal carbonate into the primary crusher that includes about 0.5% by mass or less quartz, or about 0.25% by mass or less quartz.

In some examples, product generated from the method may be used, for example, as feed for additional processing to generate ultrafine, surface-treated calcium carbonates. For example, the method may further include combining at least one of the alkaline earth metal carbonate, the alkaline earth metal carbonate particles, the reduced-size alkaline earth metal carbonate particles, or the further-reduced-size alkaline earth metal carbonate particles with carboxylic acid to produce a surface-treated alkaline earth metal carbonate particulate. In some examples, the combining may include introducing the carboxylic acid into the primary grinder (e.g., an air-swept stirred media mill, a hammer mill, or any other type of mill except a centrifugal mill), and dry grinding the alkaline earth metal carbonate and the carboxylic acid and/or salt of carboxylic acid in the primary grinder to produce a surface-treated alkaline earth metal carbonate particulate. In some examples, the carboxylic acid and/or salt of carboxylic acid may include a monofunctional carboxylic acid or mixture thereof having an average molecular weight between 100 g/mol and 500 g/mol, or an average molecular weight between 225 g/mol and 300 g/mol. In some examples, the carboxylic acid and/or salt of carboxylic acid may include an aliphatic carboxylic acid. In some examples, the carboxylic acid may include stearic acid. Other types of carboxylic acids and/or salts of carboxylic acids are contemplated.

In a further aspect, a composition may include the alkaline earth metal carbonate particulate and/or a further-reduced-size alkaline earth metal carbonate particulate obtained from any one of the above-noted methods and a polymer. In some examples, the polymer composition may have one or more of the following characteristics: the polymer includes a polyolefin; the polymer includes a vinyl chloride polymer; or the polymer composition includes between about 0.5% and 70% by mass of a particulate alkaline earth metal carbonate. In some examples, the polymer may include biopolymers and biodegradable polymers, such as, for example, polyhydroxyalkanoates (PHAs), pol-3-hydroxybutyrate (PHB), polyhydroxyvalerate (PHV), polyhydroxyhexanoate (PHH), polylactic acid (PLA), polybutylene succinate (PBS), polycaprolactone (PCL), polyglutamic acid (PGA), and polyvinyl alcohol (PVOH), which may be used, for example, in biodegradable packaging and disposable items, such as single-use cups and straws.

In some examples of the polymer composition, the polymer may include a polyolefin, a vinyl chloride, or a polylactic acid polymeric material. In some such examples, the polymer composition may exhibit at least one of improved compound consistency, improved consistency in compound processing, reduced screen blinding during compounding, or reduced oxidation and wear during processing.

In some examples of the polymer composition, the further-reduced-size alkaline earth metal particles may be used as an agonist in the film structure around which pores form in at least one of biaxially-oriented polypropylene, microporous polyethylene, or films including at least of polyethylene or polypropylene.

In a further aspect, a product may include any one of the polymer compositions noted above, and the product may include at least one of a thin film, a product bag, or a garbage bag. In some such example products, the product may exhibit at least one of improved film consistency, improved printability, reduced VOC, reduced volatile liquids, improved opacity, or improved tensile strength.

In some examples of the polymer composition, the polymer may include polyurethane. In some such examples, a product including the polymer composition may include at least one of an adhesive, a sealant, or a caulk. In some such example products, the product may exhibit at least one of improved stability, improved rheology, improved dispersion, or controlled reaction time.

In some examples of the polymer composition, the polymer may include polyvinyl chloride. In some such examples, a product including the polymer composition may include at least one of rigid vinyl, rigid vinyl siding, rigid vinyl guttering, rigid vinyl decking, rigid vinyl fencing, or rigid vinyl window profiles. In some such example products, the product may exhibit at least one of improved room temperature impact strength, low temperature impact strength, or improved processability during extrusion.

In some examples of the polymer composition, a product including the polymer composition may include a product produced by three-dimensional printing. In some such examples, the product may exhibit at least one of improved cooling rate, dimensional stability, or print reliability.

In addition, alkaline earth metal carbonate particulate may be used in food products, pharmaceuticals, joint compound, paints, adhesives, sealants, and caulks.

In a further aspect, a method of obtaining a surface-treated alkaline earth metal carbonate may include obtaining a further-reduced-size alkaline earth metal carbonate particles having a moisture content of about 0.15% by mass or less via any one of the methods described herein, and combining the further-reduced-size alkaline earth metal carbonate with at least one of carboxylic acid or carboxylic acid salt to obtain the surface-treated alkaline earth metal carbonate.

The techniques and systems described herein may be implemented in a number of ways. Example implementations are provided below with reference to the figures.

Examples

FIG. 1 is a scanning electron micrograph image of an example alkaline earth metal carbonate sample prior to processing according to the example methods described herein. Such an example sample may include limestone collected in the field and may exhibit a very high moisture content. Some examples of the methods described herein may include chemical-free, step-wise comminution that may result in moisture being removed to achieve a fifteen- to twenty-times reduction in water content in such a sample. For example, surface-accessible water may, in some examples, be removed to achieve an eighty- to ninety-times reduction of water content at the surface of the sample. As explained in more detail herein, the equivalent energy required to remove the same amount of water from the sample via a traditional drying step may be as much as about ten therms/ton.

As shown in FIG. 1, an example sample may be taken from a run of mine rock and may demonstrate a very high moisture content, for example, ranging from about 3% by mass to about 5.5% by mass as measured by a CompuTrac® moisture balance at a temperature of 150° C. This water is found to be surface water that may be easily removed. In addition to this measured surface water, such a sample may also contain a considerable level of entrained water associated with the accreting matrix binding the principal particles of the sample together. As shown in FIG. 1, the scanning electron microscopy (SEM) shows the difference between the accreting matrix and the principal particles of the sample. Without wishing to be bound by theory, water from the surface of the particles is believed to be held loosely. In contrast, the water entrained in the accreting matrix is believed to be held more tightly relative to the water from the surface due to the highly porous nature of the matrix and the very small particles held within the matrix in some samples.

Some samples of the rock may be characterized as having two distinct types of rock, both with exceptional purity, that differ in their hardness. For example, the lower hardness rock may be crumbled relatively easily in hand and may exhibit a Mohs hardness of 2 or less. The higher hardness rock, though still often quite soft and friable by limestone standards, may exhibit a Mohs hardness of about 2 to about 3, for example. The lower hardness rock may typically contain more moisture than the higher hardness rock because of the open cracks and crevices in some samples of the material. To remove both the loosely- and tightly-bound water solely through heat may typically require heating the sample to a temperature of about 400° C. for about 30 minutes, for example, as determined from a high-temperature furnace burn-off method. However, high temperature drying is typically costly because it requires both a heat source and an extended residence time at the high temperature.

Figure 2:
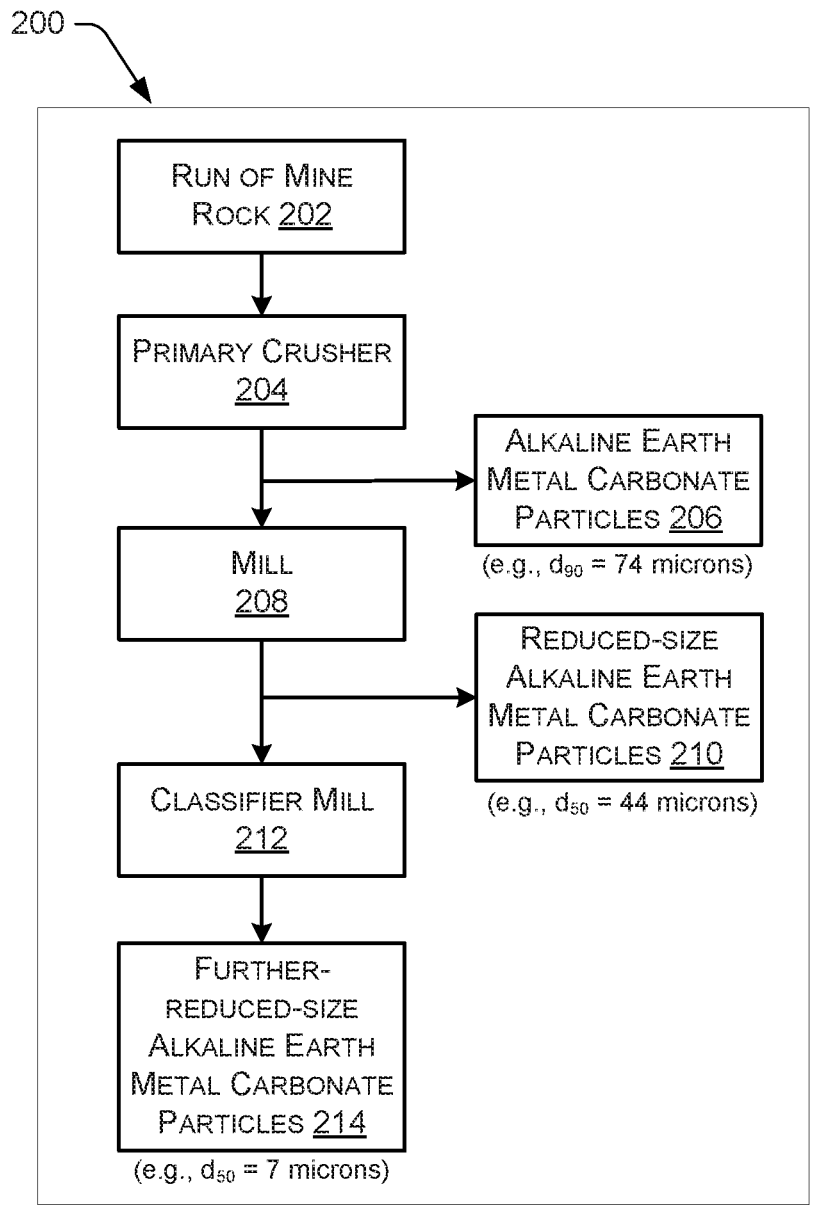
FIG. 2 is a block diagram of an example method for reducing the moisture content of alkaline earth metal carbonate.

FIG. 2 is a block diagram of an example method 200 for reducing the moisture content of alkaline earth metal carbonate. Dry grinding alkaline earth metal carbonate, according to some examples, may be achieved through a series of sequential steps that result in reducing a run of mine rock to a very fine powder, for example, as described herein. According to some examples of the method, it may serve to comminute the mine rock to a fine powder which, surprisingly, may result in a substantial reduction in the moisture content of a relatively wet mine rock feed (e.g., a limestone feed containing alkaline earth metal carbonate), for example, without a separate drying step.

As shown in FIG. 2, some examples of the method 200 may include introducing a run of mine rock 202 (e.g., alkaline earth metal carbonate (e.g., calcium carbonate-containing mine rock)) having a moisture content ranging from about 0.10% by mass to about 10% by mass (e.g., ranging from about 1.0%, 2.0%, 3.0%, 4.0%, 5.0%, 6.0%, 7.0%, 8.0%, or 9.0% by mass to about 10% by mass) into a primary crusher 204 and operating the primary crusher 204 to obtain alkaline earth metal carbonate particles 206. In some examples, the alkaline earth metal carbonate particles 206 may have a top cut particle size $d_{90}$ of 90 microns or less. The method 200 may also include introducing the alkaline earth metal carbonate particles 206 into a primary grinder such as, for example, a mill 208, and operating the primary grinder to obtain reduced-size alkaline earth metal carbonate particles 210. In some examples, the reduced-size alkaline earth metal carbonate particles 210 may have a median particle size $d_{50}$ of about 60 microns or less. The method 200 may further include introducing the reduced-size alkaline earth metal carbonate particles 210 into a classifier mill 212 and operating the classifier mill 212 to obtain further-reduced-size alkaline earth metal carbonate particles 214. In some examples, the further-reduced-size alkaline earth metal carbonate particles 214 may have a median particle size $d_{50}$ of about 12 microns or less. In some examples of the method, the moisture content of the further-reduced-size alkaline earth metal carbonate particles 214 may be about 0.10% by mass or less.

Experimental Data

Hard (Sample A) and soft (Sample B) limestone was extracted from a mine and crushed to a size less than quarter-inch rock through a jaw crusher and a screen deck with a recycle for the oversize material. It was observed that the rock from Sample B took much longer to process because of a higher initial moisture content. In particular, the wet rock of Sample B blinded the screens, so material passed multiple times through the jaw crusher. This led to a final product from Sample B that was finer and dryer than the material from Sample A.

The mine rock of Samples A and B was crushed and ground through the example process described with respect to FIG. 2. Samples at each step of the example process were analyzed for moisture content as explained below.

The raw feed was analyzed on a CompuTrac® moisture balance at a temperature of 150° C. until dry. The samples taken from each of Samples A and B at each step of the process were analyzed by two different methods, the Vapor-Pro® and loss on drying (LOD) methods. The VaporPro® method is a water-specific measurement that measures the surface bound water with AMETEK Arizona Instrument's VaporPro® XL® at 225° C. that can be removed from the mineral at a temperature of 225° C. under a dry air blanket. The LOD method analyzes the weight loss from a sample held at 400° C. for 30 minutes in a Thermolyne® furnace. This latter technique removes both the tightly- and loosely-bound water from the sample. Thermogravimetric analysis (TGA) was used to determine the rate of weight loss of product in the air classification mill (ACM) from both the first and second regions (Samples A and B). These materials were heated at a ramp rate of 20° C./minute until they reached the set-point temperature. Analyses were performed at 100° C., 200° C., 300° C., 400° C., and 450° C. These analyses were performed on a Netzsch® TGA 209 Libra F1® with the Proteus® software package under a nitrogen blanket.

The particle size reduction for each of the samples is summarized in Table 1 below for each of the sample sets analyzed.

TABLE 1

|  | Sample A | Sample B |
| --- | --- | --- |
| Feed | 51% > 297 µm | 29% > 297 µm |
| Feed to Mill | 86.9% > 44 µm | 53.83% > 44 µm |
| Mill Product | 55.2% > 44 µm | 28.9% > 44 µm |
| ACM Product | 6.83 µm median | 5.15 µm median |

Figure 3:
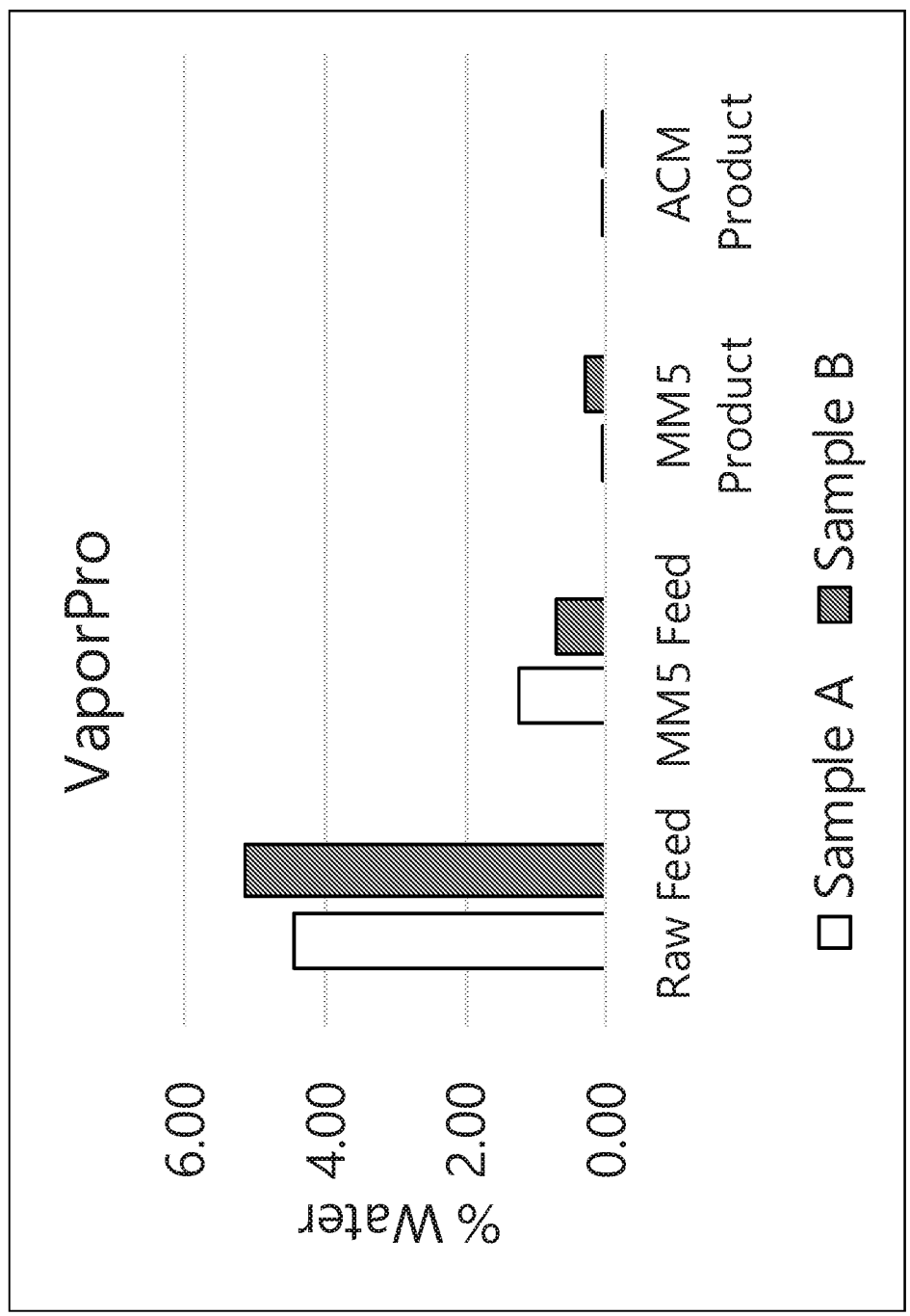
FIG. 3 is a bar graph of a moisture analysis as measured by a VaporPro® of loosely bound water in two alkaline earth metal carbonate Samples A and B at various steps of an example process for reducing the moisture content of the alkaline earth metal carbonate.

FIG. 3 is a bar graph of a moisture analysis as measured by a VaporPro® of loosely bound water in two alkaline earth metal carbonate Samples A and B at various steps of an example process for reducing the moisture content of the alkaline earth metal carbonate. As shown in FIG. 3, as material moved through the process, the water was released from the rock. The water content was reduced from over 4.5% by mass to less than 0.07% by mass for both Samples A and B. This water loss occurred more quickly in the process for Sample A with the product from the mill being almost completely dry.

Figure 4:
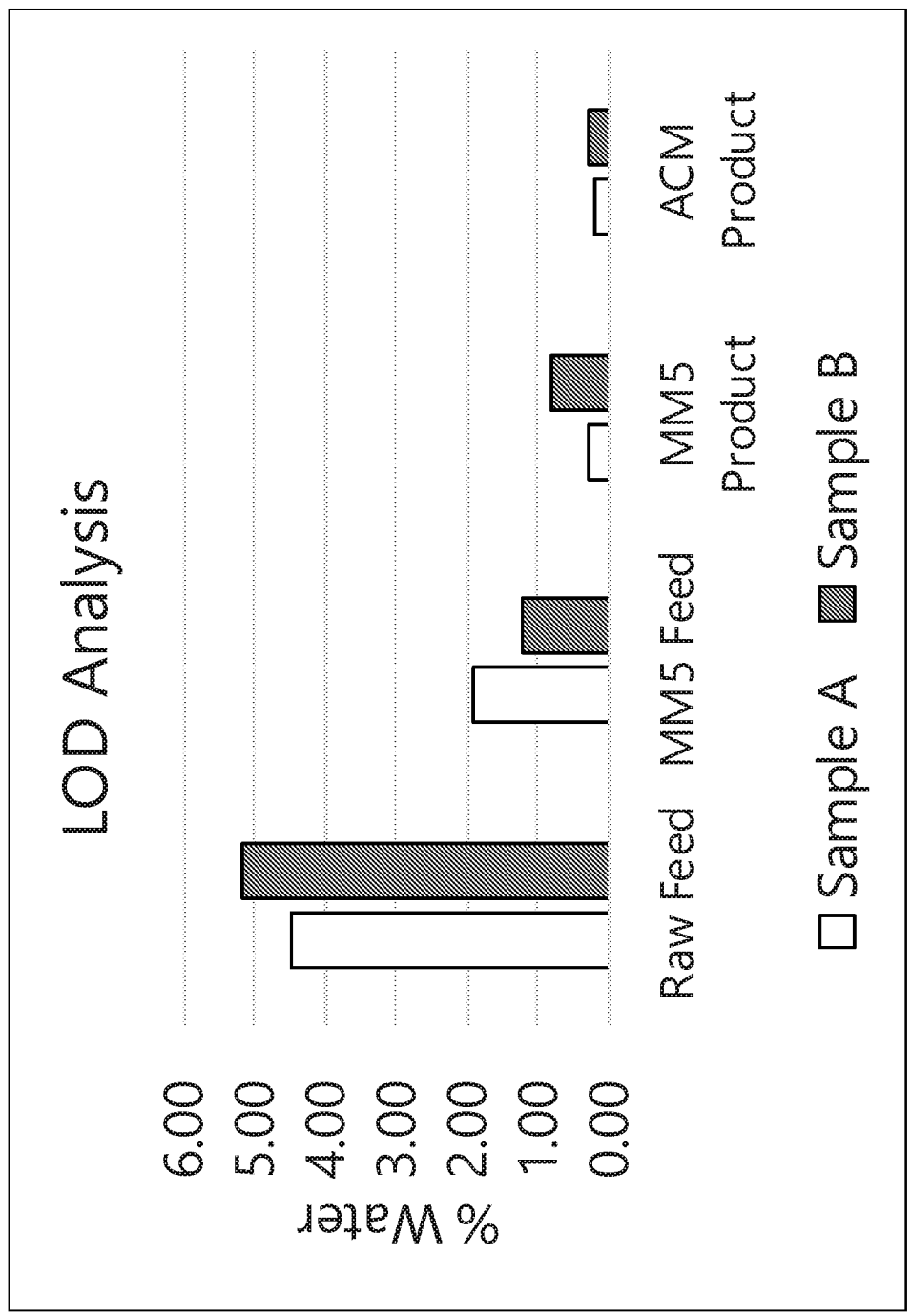
FIG. 4 is a bar graph of a moisture analysis as measured by a loss on drying analysis of total water in the two alkaline earth metal carbonate Samples A and B of FIG. 3 at various steps of an example process for reducing the moisture content of the alkaline earth metal carbonate.

FIG. 4 is a bar graph of a moisture analysis as measured by a loss on drying (LOD) analysis of total water in the two alkaline earth metal carbonate Samples A and B of FIG. 3 at various steps of the example process for reducing the moisture content of the alkaline earth metal carbonate. As shown in FIG. 4, the example process also acted to dramatically remove the tightly bound water, as measured at a temperature of 400° C. in the furnace.

As apparent from FIGS. 3 and 4, the moisture content is reduced as a function of the grinding process. The difference between the two water contents shown in FIGS. 3 and 4 provides a measure of the amount of tightly bound water in the system. The LOD moisture level is consistently higher than that measured by the VaporPro®. Without wishing to be bound by theory, this may be because the tightly bound water can only be removed at the higher temperature and longer residence time found in the furnace LOD test.

Figure 5:
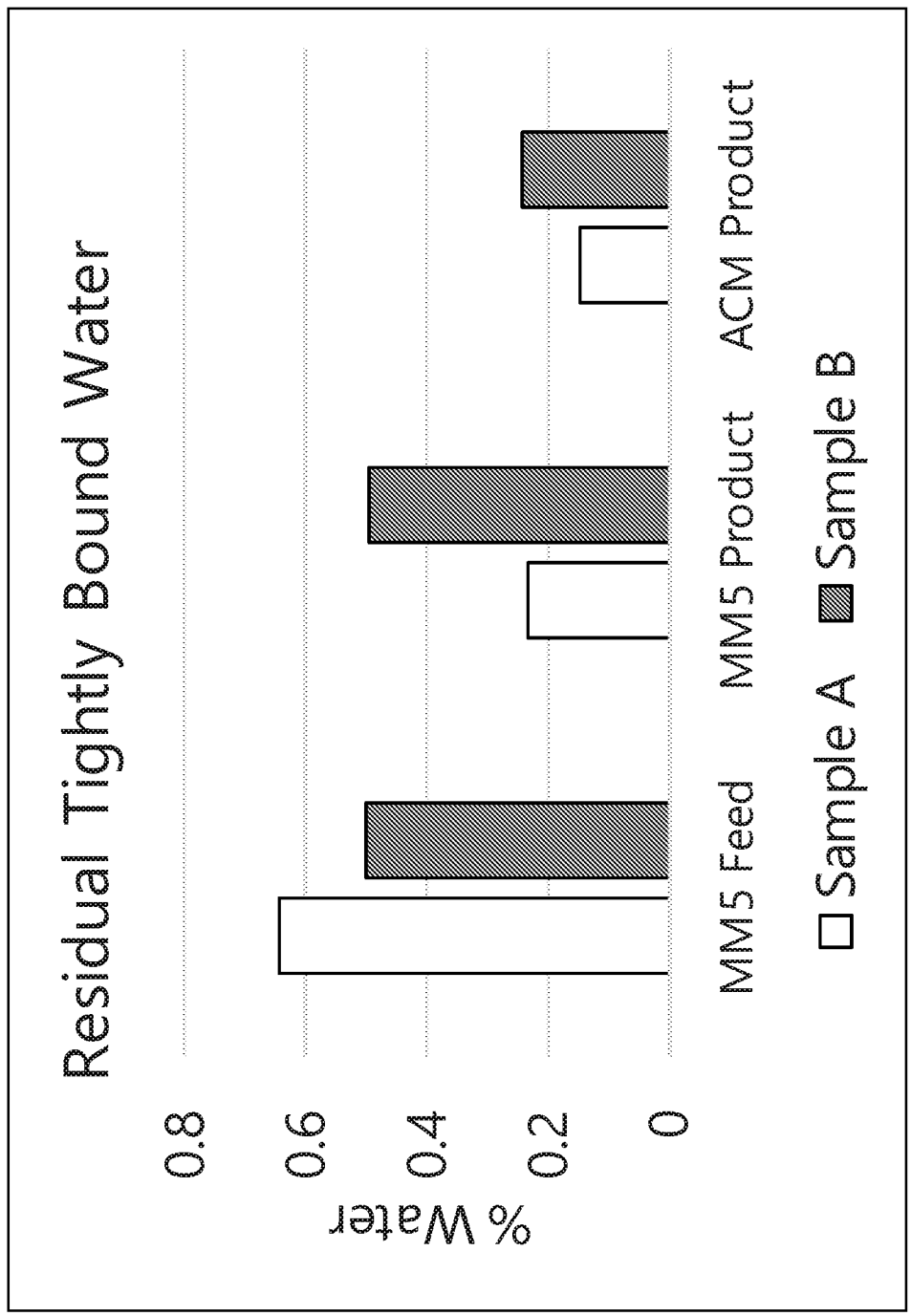
FIG. 5 is a bar graph showing the difference between the moisture contents shown in FIGS. 3 and 4, which provides an indication of the tightly bound water in the two alkaline earth metal carbonate Samples A and B.

FIG. 5 is a bar graph showing the difference between the moisture contents shown in FIGS. 3 and 4, which provides an indication of the tightly bound water in the two alkaline earth metal carbonate Samples A and B. FIG. 5 shows that the tightly bound water is also being removed from the system as a function of the grinding process.

A kinetic analysis on the moisture release rates of 5-micron product at a range of temperatures allows us to determine the activation energy associated with releasing this tightly bound water from the samples. A set of samples were heated to different temperatures from 100° C. to 400° C. for an hour. The amount of water released during this time provides a rate of water release in units of % by mass per hour (%/hr).

Figure 6:
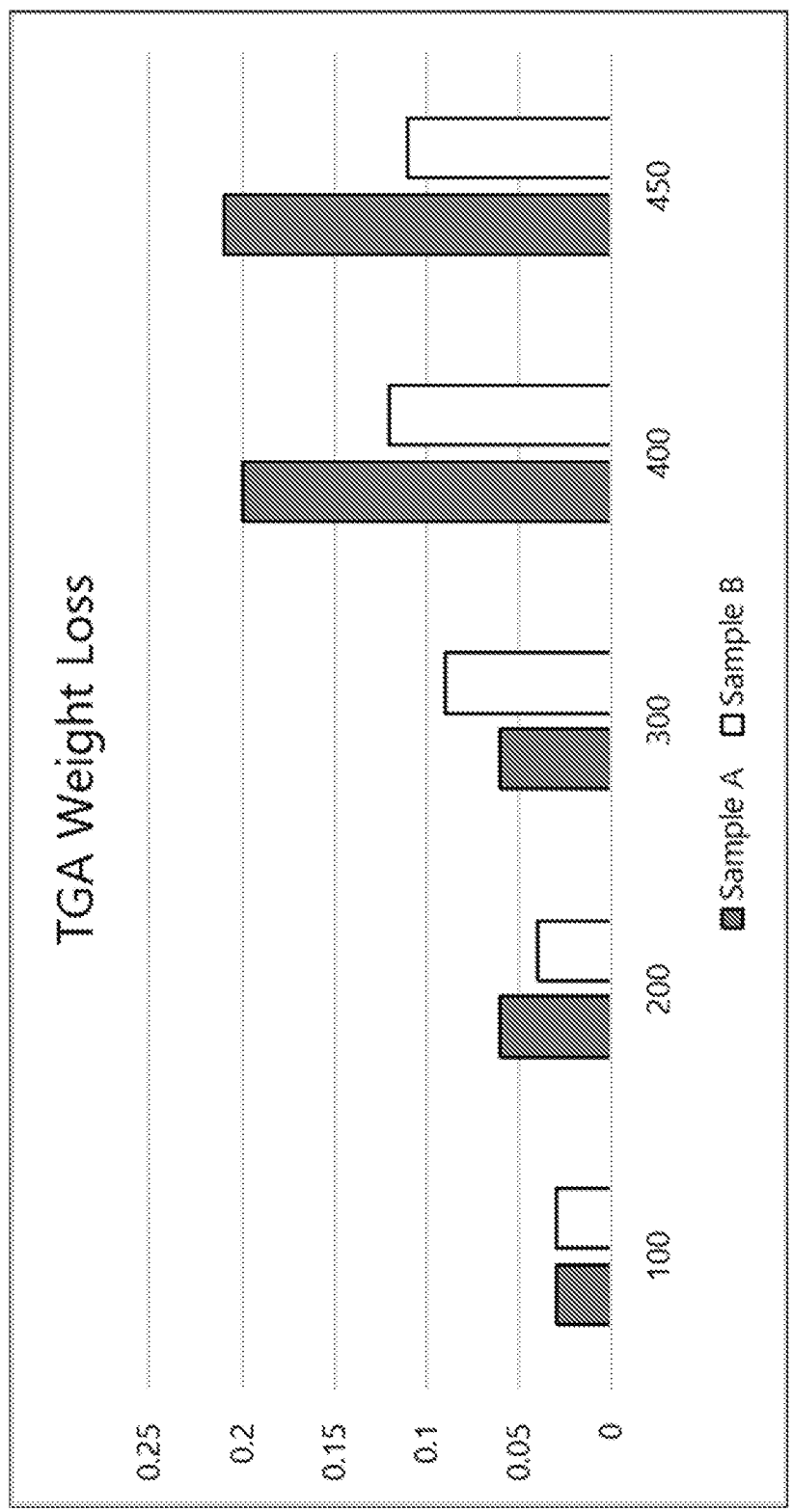
FIG. 6 is a bar graph showing the weight loss of the two alkaline earth metal carbonate Samples A and B as a function of temperature over one hour as measured by a thermogravimetric analysis.

FIG. 6 is a bar graph showing the weight loss of the two alkaline earth metal carbonate Samples A and B as a function of temperature over one hour as measured by a thermogravimetric analysis. As shown in FIG. 6, the weight loss increases with increasing temperature over the hour. From this analysis, it is possible to calculate the energy required to remove the tightly bound water through an Arrhenius calculation. By plotting the ln(rate) as a function of temperature, it is possible to determine the activation energy required to remove this tightly bound water from the slope of the plot, as described in Equation 1 below.

$$\ln(\text{rate}) = -E_A\left(\frac{1}{RT}\right) + \ln k. \quad \text{(Equation 1)}$$

In Equation 1, $E_A$ represents the activation energy, R is the gas constant (8.314 J/Kmole), T is absolute temperature (in Kelvin), and k is the rate constant, which can be determined from the intercept.

Figure 7:
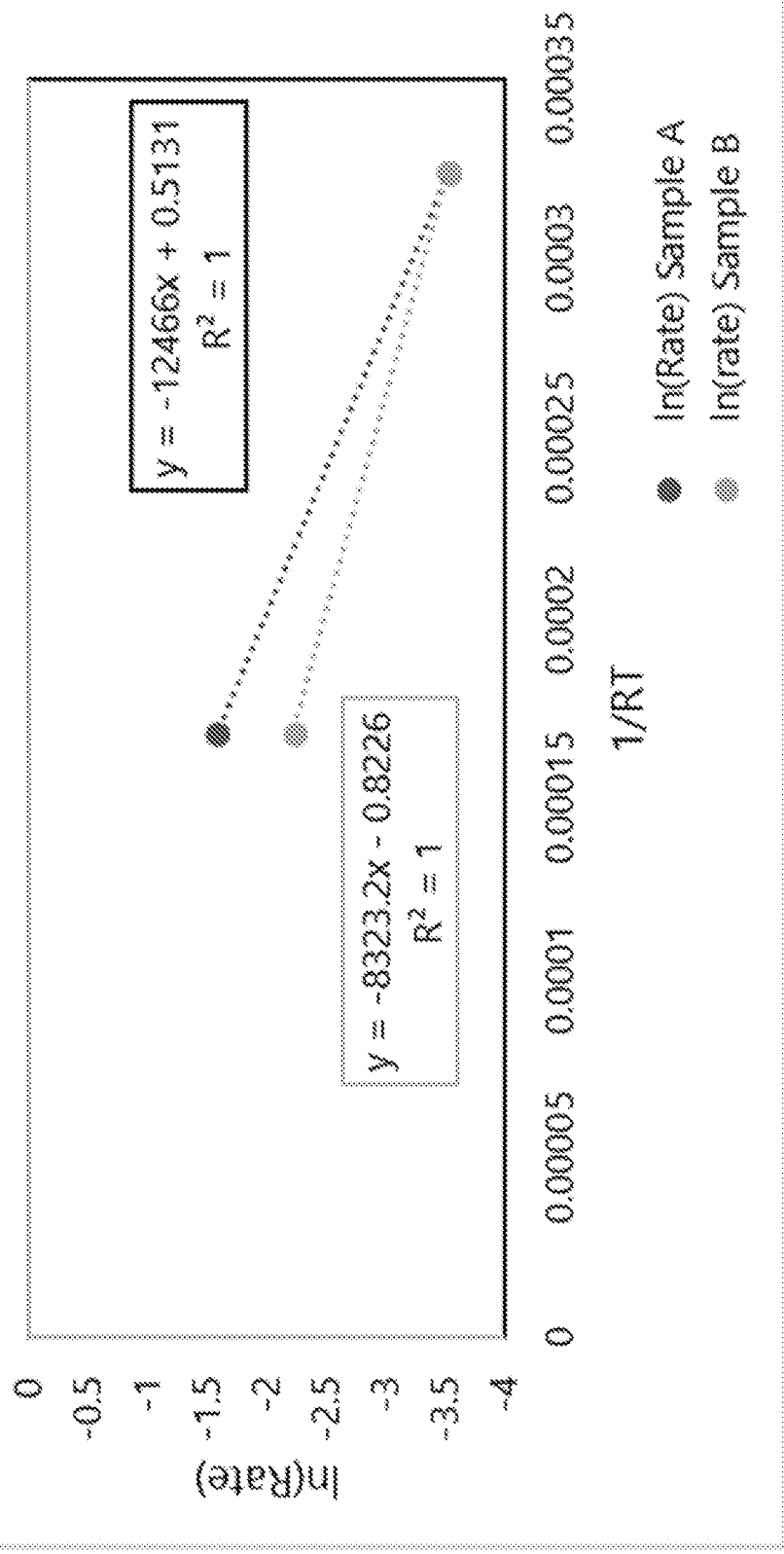
FIG. 7 is a graph showing an activation energy calculation for determining the energy required to remove tightly bound water from the two alkaline earth metal carbonate Samples A and B.

FIG. 7 is a graph showing an activation energy calculation for determining the energy required to remove tightly bound water from the two alkaline earth metal carbonate Samples A and B. The minimum temperature in this analysis is chosen to be 200° C. to focus only on the most tightly bound water. The calculated activation energy from these two analyses are 12.2 kJ/mole and 15.9 kJ/mole, respectively. The average of these two values provides a value of 14.0 kJ/mole, which represents the energy, in excess of the energy to remove the surface water, required to remove the tightly bound water from each of the Samples A and B.

From this data, it is possible to calculate the total energy required to remove these levels of water based on the type of water removed. As a result, from this data we can calculate the equivalent energy that would be required to remove the water if only the heating step were used. This analysis makes four assumptions. First, the tightly bound water is removed with an energy equivalent to the activation energy for the drying, as calculated from FIG. 7 of 14.0 kJ/mole, which is 777 J/g. Second, the heating process requires that the calcium carbonate reach the stated temperatures and that the heat capacity of the samples remains constant at a value of 2.86 J/g ° C. across the temperature range from room temperature (20° C.) to a final temperature of 400° C. Third, the energy to heat the loosely bound water in the process is calculated in three steps from room temperature to 200° C. Initially, the water is treated as heating from room temperature to 100° C. (the boiling point of water) with a constant heat capacity of 4.187 J/g° C. The phase transition between liquid and vapor occurs at a temperature of 100° C. and the enthalpy for water at this transition is 2,258 J/g. Water, in the vapor phase, must reach the set temperature of 200° C. to be fully released from the mineral and the heat capacity of the vapor is 1.996 J/g° C. And fourth, all processes are occurring as equilibrium steps and the energy is additive.

Figure 8:
FIG. 8 is a tree diagram for Sample A of the alkaline earth metal carbonate samples showing the relative energy cost for drying the mineral to remove all water.

FIG. 8 is a tree diagram for Sample A of the alkaline earth metal carbonate samples showing the relative energy cost for drying the mineral to remove tightly- and loosely-bound water. FIG. 8 illustrates the results of the above-noted calculation for Sample A. This shows that the greatest energy requirement comes from heating the calcium carbonate to achieve the temperatures necessary to devolatilize the water.

Figure 9:
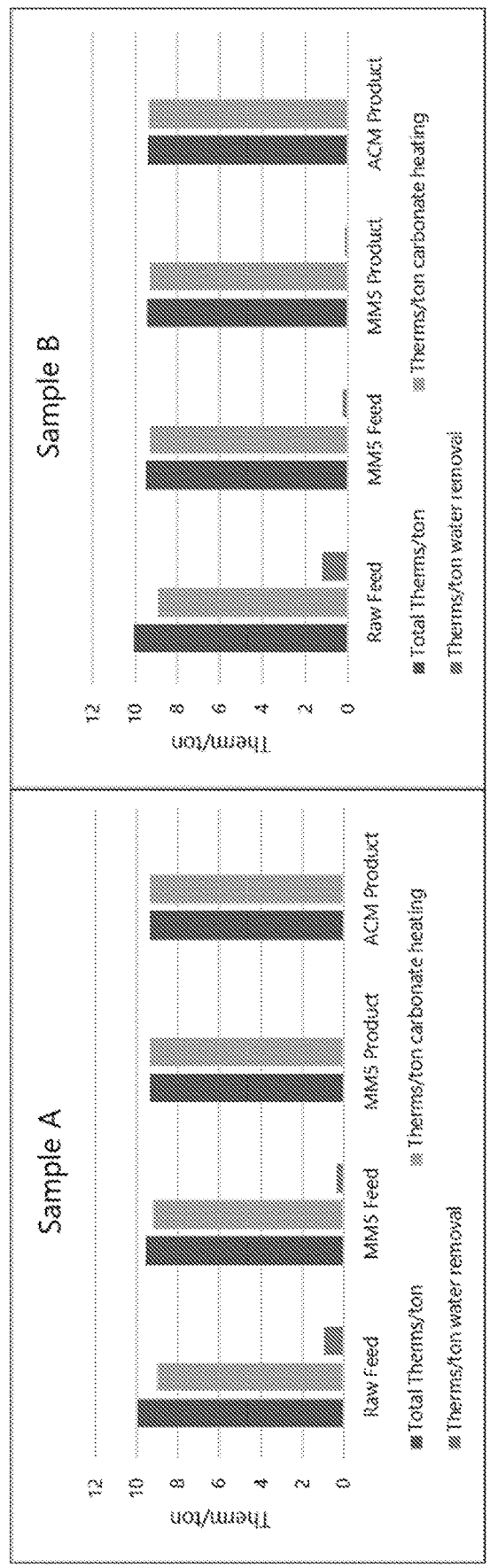
FIG. 9 shows bar graphs of the respective energy requirements to achieve a dry product from various steps of an example method for reducing moisture content in each of the two alkaline earth metal carbonate Samples A and B.

FIG. 9 shows bar graphs of the respective energy requirements to achieve a dry product from various steps of the example method for reducing moisture content in each of the two alkaline earth metal carbonate Samples A and B. FIG. 9 summarizes the energy requirements to fully remove all of the water present in the mineral that can be removed at or below 400° C. The bar graphs show the total energy, as well as the energy to heat the carbonate and the energy to remove the water.

Figure 10:
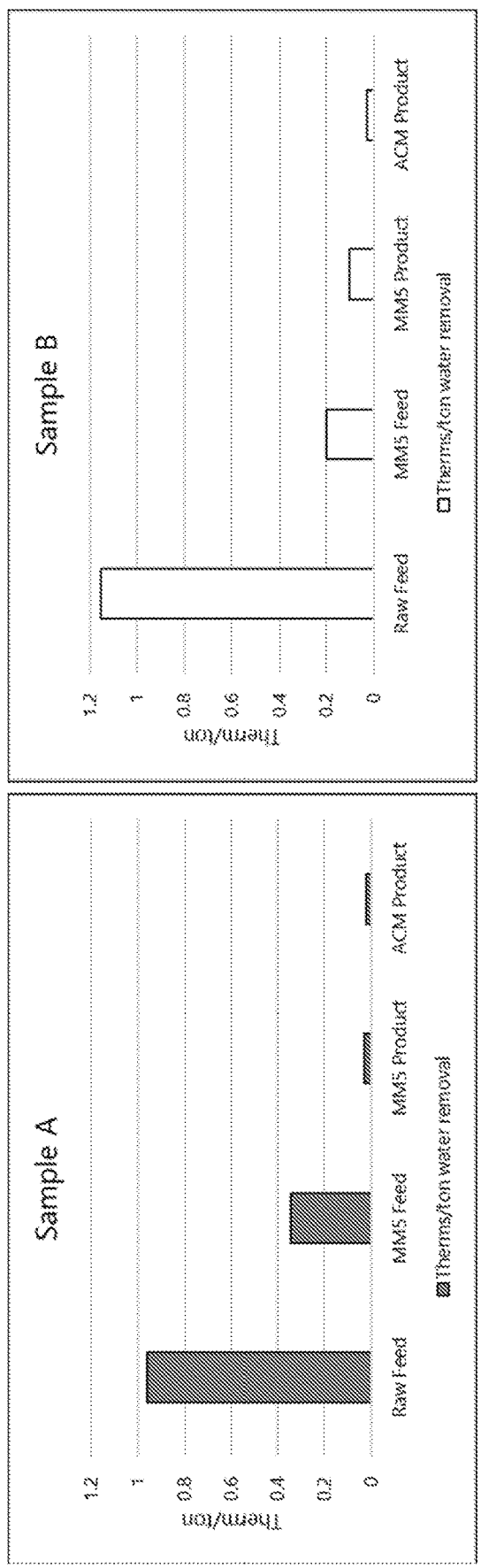
FIG. 10 shows bar graphs of the respective energy requirements to remove water from the two alkaline earth metal carbonate Samples A and B from various steps of an example method for reducing moisture content.

FIG. 10 shows bar graphs of the respective energy requirements to remove water from the two alkaline earth metal carbonate Samples A and B from various steps of the example method for reducing moisture content. FIG. 10 focuses solely on the energy required to remove the water from Samples A and B. The grinding process, according to some examples described herein, removes all but approximately 0.2% by mass of the starting moisture. Thus, the total energy to achieve this same level of drying via high temperature heating is approximately 10 therms/ton. Table 2 below summarizes the calculated energies used to generate these figures. The energy required drops with each step of the example method as some of the water has been removed in the previous step(s).

TABLE 2

| | | Water Content | | Drying Energy | |
| | | | | | |
| | Sample | % Tightly Bound Water | % Loosely Bound Water | Total Energy to Dry (therms/ton) | Energy to Volatilize Water (therms/ton) |
|---|---|---|---|---|---|
| A | Feed | 3.816 | 0.644 | 9.948 | 0.960 |
| | M Feed | 1.260 | 0.644 | 9.572 | 0.346 |
| | MM Product | 0.070 | 0.231 | 9.370 | 0.033 |
| | ACM Product | 0.050 | 0.146 | 9.362 | 0.022 |
| B | Feed | 4.66 | 0.498 | 10.062 | 1.153 |
| | MM Feed | 0.706 | 0.498 | 9.481 | 0.203 |
| | MM Product | 0.300 | 0.494 | 9.421 | 0.105 |
| | ACM Product | 0.057 | 0.242 | 9.369 | 0.020 |

This illustrates that some methods described herein may provide the equivalent effect as heating the sample using an energy input of 1 therm/ton solely to remove the water from the sample. Without wishing to be bound by theory, this effect is believed to be the result of two attributes of some examples of the methods described herein. The combination of grinding, which releases entrained water from inside the rock and introduces frictional heating as a result of the high shear forces in the mills, and the air flow used to transfer and classify the material (in the classifier mill), which provides an evaporative transfer gradient, act to accomplish this drying, for example, without any separate drying steps. Thus, some examples of the methods described herein may result in reduced power requirements and associated cost savings.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples illustrated and described, and without departing from the spirit and scope of the present invention, which is set forth in the following claims.

Example Clauses

A. An example method for reducing moisture content of alkaline earth metal carbonate, the method comprising:
introducing alkaline earth metal carbonate having a moisture content ranging from about 0.1% by mass to about 10% by mass (e.g., ranging from about 1.0%, 2.0%, 3.0%, 4.0%, 5.0%, 6.0%, 7.0%, 8.0%, or 9.0% by mass to about 10% by mass) into a primary crusher;
operating the primary crusher to obtain alkaline earth metal carbonate particles, such that the alkaline earth metal carbonate particles have a top cut particle size $d_{90}$ of 90 microns or less;
introducing the alkaline earth metal carbonate particles into a primary grinder;
operating the primary grinder to obtain reduced-size alkaline earth metal carbonate particles, such that the reduced-size alkaline earth metal carbonate particles have a median particle size $d_{50}$ of about 60 microns or less;
introducing the reduced-size alkaline earth metal carbonate particles into a classifier mill; and
operating the classifier mill to obtain further-reduced-size alkaline earth metal carbonate particles, such that the further-reduced-size alkaline earth metal carbonate particles have a median particle size $d_{50}$ of about 12 microns or less,
wherein the moisture content of the further-reduced-size alkaline earth metal carbonate particles is about 0.15% by mass or less.

B. The method of example A, wherein the method does not comprise introducing any of the alkaline earth metal carbonate, the alkaline earth metal carbonate particles, the reduced-size alkaline earth metal carbonate particles, or the further-reduced-size alkaline earth metal carbonate particles into a dryer.

C. The method of example A or example B, wherein operating the primary crusher comprises operating the primary crusher such that the alkaline earth metal carbonate particles have a moisture content of about 3.0% by mass or less.

D. The method of any one of example A through example C, wherein operating the primary grinder comprises operating the primary grinder such that the reduced-size alkaline earth metal carbonate particles have a moisture content of about 1.0% by mass or less.

E. The method of any one of example A through example D, wherein operating the classifier mill comprises operating the classifier mill such that the further-reduced-size alkaline earth metal carbonate particles have a moisture content of about 0.10% by mass or less.

F. The method of any one of example A through example E, wherein operating the primary crusher comprises operating the primary crusher such that the alkaline earth metal carbonate particles have a top cut particle size $d_{90}$ of about 80 microns or less.

G. The method of any one of example A through example F, wherein operating the primary grinder comprises operating the primary grinder such that the reduced-size alkaline earth metal carbonate particles have a median particle size $d_{50}$ of about 50 microns or less.

H. The method of any one of example A through example G, wherein operating the classifier mill comprises operating the classifier mill such that the further-reduced-size alkaline earth metal carbonate particles have a median particle size $d_{50}$ of about 8 microns or less, a median particle size $d_{50}$ of about 7 microns or less, a median particle size $d_{50}$ of about 5 microns or less, a median particle size $d_{50}$ of about 3 microns or less, or a median particle size $d_{50}$ of about 0.7 microns or less.

I. The method of any one of example A through example H, wherein introducing the alkaline earth metal carbonate into the primary crusher comprises introducing calcium carbonate into the primary crusher.

J. The method of any one of example A through example I, wherein introducing the alkaline earth metal carbonate into the primary crusher comprises introducing alkaline earth metal carbonate into the primary crusher that has a purity ranging from about 98.5% to about 99.9%.

K. The method of any one of example A through example J, wherein introducing the alkaline earth metal carbonate into the primary crusher comprises introducing alkaline earth metal carbonate into the primary crusher that comprises about 0.5% by mass or less quartz.

L. The method of any one of example A through example K, wherein the primary grinder comprises any grinding mill excluding a centrifugal mill.

M. An example method for reducing moisture content of alkaline earth metal carbonate, the method comprising:
introducing alkaline earth metal carbonate having a moisture content ranging between about 0.10% by mass to about 10% by mass (e.g., ranging from about 1.0%, 2.0%, 3.0%, 4.0%, 5.0%, 6.0%, 7.0%, 8.0%, or 9.0% by mass to about 10% by mass) into a primary crusher;
operating the primary crusher to obtain alkaline earth metal carbonate particles having a moisture content of about 3.0% by mass or less;
introducing the alkaline earth metal carbonate particles into a primary grinder;
operating the primary grinder to obtain reduced-size alkaline earth metal carbonate particles having a moisture content of about 1.0% by mass or less;
introducing the reduced-size alkaline earth metal carbonate particles into a classifier mill; and
operating the classifier mill to obtain further-reduced-size alkaline earth metal carbonate particles having a moisture content of about 0.15% by mass or less.

N. The method of example M, wherein the method does not comprise introducing any of the alkaline earth metal carbonate, the alkaline earth metal carbonate particles, the reduced-size alkaline earth metal carbonate particles, or the further-reduced-size alkaline earth metal carbonate particles into a dryer.

O. The method of example M or example N, wherein operating the primary crusher comprises operating the primary crusher such that the alkaline earth metal carbonate particles have a top cut particle size $d_{90}$ of about 90 microns or less.

P. The method of any one of example M through example O, wherein operating the primary grinder comprises operating the primary grinder such that the reduced-size alkaline earth metal carbonate particles have a median particle size $d_{50}$ of about 60 microns or less.

Q. The method of any one of example M through example P, wherein operating the classifier mill comprises operating the classifier mill such that the further-reduced-size alkaline earth metal carbonate particles have a median particle size $d_{50}$ of about 12 microns or less.

R. The method of any one of example M through example Q, wherein operating the primary crusher comprises operating the primary crusher such that the alkaline earth metal carbonate particles have a moisture content of about 2.0% by mass or less.

S. The method of any one of example M through example R, wherein operating the primary grinder comprises operating the primary grinder such that the reduced-size alkaline earth metal carbonate particles have a moisture content of about 0.75% by mass or less.

T. The method of any one of example M through example S, wherein operating the classifier mill comprises operating the classifier mill such that the further-reduced-size alkaline earth metal carbonate particles have a moisture content of about 0.08% by mass or less.

U. An example method for reducing moisture content of alkaline earth metal carbonate, the method comprising:
introducing alkaline earth metal carbonate having a moisture content of about 10% by mass or less into a primary grinder;
operating the primary grinder to obtain reduced-size alkaline earth metal carbonate particles, such that the reduced-size alkaline earth metal carbonate particles have a median particle size $d_{50}$ of about 60 microns or less and a moisture content of about 1.0% by mass or less;
introducing the reduced-size alkaline earth metal carbonate particles into a classifier mill; and
operating the classifier mill to obtain further-reduced-size alkaline earth metal carbonate particles, such that the further-reduced-size alkaline earth metal carbonate particles have a moisture content of about 0.15% by mass or less.

V. The method of example U, wherein the method does not comprise introducing any of the alkaline earth metal carbonate, the reduced-size alkaline earth metal carbonate particles, or the further-reduced-size alkaline earth metal carbonate particles into a dryer.

W. The method of example U or example V, wherein operating the classifier mill comprises operating the classifier mill such that the further-reduced-size alkaline earth metal carbonate particles have a median particle size $d_{50}$ of about 12 microns or less.

X. The method of any one of example U through example W, wherein operating the classifier mill comprises operating the classifier mill such that the further-reduced-size alkaline earth metal carbonate particles have a median particle size $d_{50}$ of about 8 microns or less and a moisture content of about 0.08% by mass or less.

Y. The method of any one of example U through example X, wherein operating the classifier mill comprises operating the classifier mill such that the further-reduced-size alkaline earth metal carbonate particles have a median particle size $d_{50}$ of about 5 microns or less and a moisture content of about 0.075% by mass or less.

Z. An example method of obtaining a surface-treated alkaline earth metal carbonate, the method comprising:
obtaining the further-reduced-size alkaline earth metal carbonate particles having a moisture content of about 0.15% by mass or less via any one of the methods of example A through example Y; and combining the further-reduced-size alkaline earth metal carbonate with at least one of carboxylic acid or carboxylic acid salt to obtain the surface-treated alkaline earth metal carbonate.

AA. An example polymer composition comprising:
a further-reduced-size alkaline earth metal carbonate particulate obtained from the method of any one of example A through example Y; and
a polymer,
wherein polymer composition has at least one of the following characteristics:
the polymer comprises a polyolefin;
the polymer comprises a vinyl chloride polymer; or
the polymer composition comprises between about 0.5% and 70% by mass of a particulate alkaline earth metal carbonate.

BB. The polymer composition of example AA, wherein the polymer comprises a polyolefin.

CC. The polymer composition of example AA or example BB, wherein the polymer composition exhibits at least one of improved compound consistency, improved consistency in compound processing, reduced screen blinding during compounding, or reduced oxidation and wear during processing.

DD. The polymer composition of any one of example AA through example CC, wherein the further-reduced-size alkaline earth metal may be used as an agonist in the film structure around which pores form in at least one of biaxially-oriented polypropylene, microporous polyethylene, or films including at least of polyethylene or polypropylene.

EE. An example product comprising the polymer composition of any one of example AA through example DD, wherein the product comprises at least one of a thin film, a product bag, or a garbage bag.

FF. The product of example EE, wherein the product exhibits at least one of improved film consistency, improved printability, reduced VOC, reduced volatile liquids, improved opacity, or improved tensile strength.

GG. The polymer composition of any one of example AA through example DD, wherein the polymer comprises polyurethane.

HH. An example product comprising the polymer composition of example GG, wherein the product comprises at least one of an adhesive, a sealant, or a caulk.

II. The product of example HH, wherein the product exhibits at least one of improved stability, improved rheology, improved dispersion, or controlled reaction time.

JJ. The polymer composition of any one of example AA through example DD, wherein the polymer comprises polyvinyl chloride.

KK. An example product comprising the polymer composition of example JJ, wherein the product comprises at least one of rigid vinyl, rigid vinyl siding, rigid vinyl guttering, rigid vinyl decking, rigid vinyl fencing, or rigid vinyl window profiles.
LL. The product of example KK, wherein the product exhibits at least one of improved room temperature impact strength, improved low temperature impact strength, or improved processability during extrusion.
MM. An example product comprising the polymer composition of example JJ, wherein the product comprises a product produced by three-dimensional printing.
NN. The product of example MM, wherein the product exhibits at least one of improved cooling rate, dimensional stability, or print reliability.

What is claimed is:

1. A method for reducing moisture content of alkaline earth metal carbonate, the method comprising:
   introducing alkaline earth metal carbonate having a moisture content ranging from about 0.1% by mass to about 10% by mass into a primary crusher;
   operating the primary crusher to obtain alkaline earth metal carbonate particles, such that the alkaline earth metal carbonate particles have a top cut particle size $d_{90}$ of 90 microns or less; introducing the alkaline earth metal carbonate particles into a primary grinder;
   operating the primary grinder to obtain reduced-size alkaline earth metal carbonate particles, such that the reduced-size alkaline earth metal carbonate particles have a median particle size $d_{50}$ of about 60 microns or less;
   introducing the reduced-size alkaline earth metal carbonate particles into a classifier mill; and
   operating the classifier mill to obtain further-reduced-size alkaline earth metal carbonate particles, such that the further-reduced-size alkaline earth metal carbonate particles have a median particle size $d_{50}$ of about 12 microns or less,
   wherein the moisture content of the further-reduced-size alkaline earth metal carbonate particles is about 0.15% by mass or less,
   the method excluding:
   (a) introducing any of the alkaline earth metal carbonate, the alkaline earth metal carbonate particles, the reduced-size alkaline earth metal carbonate particles, or the further reduced-size alkaline earth metal carbonate particles into a dryer,
   (b) adding water to any of the alkaline earth metal carbonate, the alkaline earth metal carbonate particles, the reduced-size alkaline earth metal carbonate particles, or the further-reduced-size alkaline earth metal carbonate particles, and
   (c) adding chemical dispersants and grinding aids to any of the alkaline earth metal carbonate, the alkaline earth metal carbonate particles, the reduced-size alkaline earth metal carbonate particles, or the further-reduced-size alkaline earth metal carbonate particles.

2. The method of claim 1, wherein operating the primary crusher comprises operating the primary crusher such that the alkaline earth metal carbonate particles have a moisture content of about 3.0% by mass or less.

3. The method of claim 1, wherein operating the primary grinder comprises operating the primary grinder such that the reduced-size alkaline earth metal carbonate particles have a moisture content of about 1.0% by mass or less.

4. The method of claim 1, wherein operating the classifier mill comprises operating the classifier mill such that the further-reduced-size alkaline earth metal carbonate particles have a moisture content of about 0.10% by mass or less.

5. The method of claim 1, wherein operating the primary crusher comprises operating the primary crusher such that the alkaline earth metal carbonate particles have a top cut particle size $d_{90}$ of about 80 microns or less.

6. The method of claim 1, wherein operating the primary grinder comprises operating the primary grinder such that the reduced-size alkaline earth metal carbonate particles have a median particle size $d_{50}$ of about 50 microns or less.

7. The method of claim 1, wherein operating the classifier mill comprises operating the classifier mill such that the further-reduced-size alkaline earth metal carbonate particles have a median particle size $d_{50}$ of about 8 microns or less.

8. The method of claim 1, wherein introducing the alkaline earth metal carbonate into the primary crusher comprises introducing calcium carbonate into the primary crusher.

9. The method of claim 1, wherein introducing the alkaline earth metal carbonate into the primary crusher comprises introducing alkaline earth metal carbonate into the primary crusher that has at least one of a purity ranging from about 98.5% to about 99.9% or comprises about 0.5% by mass or less quartz.

10. A method for reducing moisture content of alkaline earth metal carbonate, the method comprising:
    introducing alkaline earth metal carbonate having a moisture content ranging between about 0.1% by mass to about 10% by mass into a primary crusher;
    operating the primary crusher to obtain alkaline earth metal carbonate particles having a moisture content of about 3.0% by mass or less;
    introducing the alkaline earth metal carbonate particles into a primary grinder;
    operating the primary grinder to obtain reduced-size alkaline earth metal carbonate particles having a moisture content of about 1.0% by mass or less;
    introducing the reduced-size alkaline earth metal carbonate particles into a classifier mill; and
    operating the classifier mill to obtain further-reduced-size alkaline earth metal carbonate particles having a moisture content of about 0.15% by mass or less,
    the method excluding:
    (a) introducing any of the alkaline earth metal carbonate, the alkaline earth metal carbonate particles, the reduced-size alkaline earth metal carbonate particles, or the further reduced-size alkaline earth metal carbonate particles into a dryer,
    (b) adding water to any of the alkaline earth metal carbonate, the alkaline earth metal carbonate particles, the reduced-size alkaline earth metal carbonate particles, or the further-reduced-size alkaline earth metal carbonate particles, and
    (c) adding chemical dispersants and grinding aids to any of the alkaline earth metal carbonate, the alkaline earth metal carbonate particles, the reduced-size alkaline earth metal carbonate particles, or the further-reduced-size alkaline earth metal carbonate particles.

11. The method of claim 10, wherein operating the primary crusher comprises operating the primary crusher such that the alkaline earth metal carbonate particles have a top cut particle size $d_{90}$ of about 90 microns or less.

12. The method of claim 10, wherein operating the primary grinder comprises operating the primary grinder such that the reduced-size alkaline earth metal carbonate particles have a median particle size $d_{50}$ of about 60 microns or less.

13. The method of claim 10, wherein operating the classifier mill comprises operating the classifier mill such that the further-reduced-size alkaline earth metal carbonate particles have a median particle size $d_{50}$ of about 12 microns or less.

14. The method of claim 10, wherein operating the primary crusher comprises operating the primary crusher such that the alkaline earth metal carbonate particles have a moisture content of about 2.0% by mass or less.

15. The method of claim 10, wherein operating the primary grinder comprises operating the primary grinder such that the reduced-size alkaline earth metal carbonate particles have a moisture content of about 0.75% by mass or less.

16. The method of claim 10, wherein operating the classifier mill comprises operating the classifier mill such that the further-reduced-size alkaline earth metal carbonate particles have a moisture content of about 0.08% by mass or less.

17. A method of obtaining a surface-treated alkaline earth metal carbonate, the method comprising:
   obtaining the further-reduced-size alkaline earth metal carbonate particles having a moisture content of about 0.15% by mass or less via the method of claim 1; and
   combining the further-reduced-size alkaline earth metal carbonate with at least one of carboxylic acid or carboxylic acid salt to obtain the surface-treated alkaline earth metal carbonate.

\* \* \* \* \*